C. W. STELTING.
GEAR PULLER FOR AUTOMOBILES AND ALL OTHER KINDS OF MACHINERY.
APPLICATION FILED JAN. 26, 1920.

1,351,307.  Patented Aug. 31, 1920.

Inventor,
Carl W. Stelting
Attorney.

UNITED STATES PATENT OFFICE.

CARL W. STELTING, OF MEDFORD, OKLAHOMA, ASSIGNOR OF ONE-HALF TO CLARENCE R. NELSON, OF MEDFORD, OKLAHOMA.

GEAR-PULLER FOR AUTOMOBILES AND ALL OTHER KINDS OF MACHINERY.

1,351,307.  Specification of Letters Patent.  Patented Aug. 31, 1920.

Application filed January 26, 1920. Serial No. 354,039.

*To all whom it may concern:*

Be it known that I, CARL W. STELTING, a citizen of the United States of America, and resident of Medford, in the county of Grant and State of Oklahoma, have invented certain new and useful Improvements in Gear-Pullers for Automobiles and All other Kinds of Machinery, of which the following is a specification.

This invention relates to gear pullers for timing gears and all other kind of machinery and the invention has special reference to novel means for adjustably holding the arms of such a gear puller with relation to the head on which the arms are oscillatably mounted and to details of construction whereby a device of the character indicated may be produced without the employment of highly skilled workmen and from stock materials.

With the foregoing and other objects in view, the invention consists in the construction as well as in the arrangement and combination of parts to be hereinafter more fully set forth and claimed.

In describing the invention in detail, reference will be had to the accompanying drawings forming part of this specification wherein like characters denote corresponding parts in the several views and in which—

Figure 1:
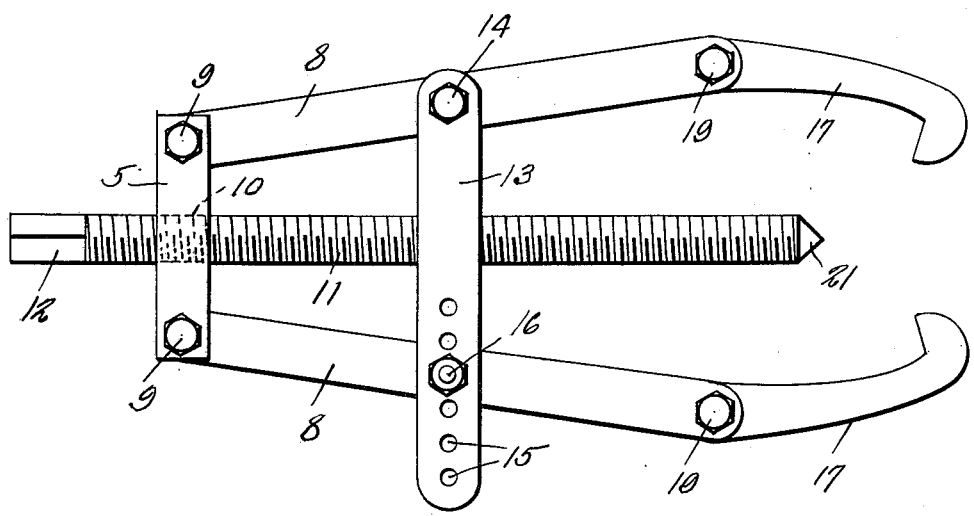
Figure 2:
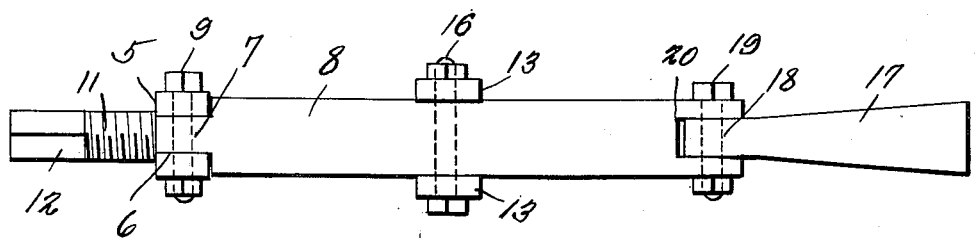

Figure 1 is a view in elevation of a gear pulling implement embodying the invention and Fig. 2 is an edge elevation of the same.

In these drawings 5 denotes a head having recesses 6 in the ends forming seats for the shanks 7 of the arms 8, which arms are pivotally connected to the head by the fastenings 9 which are preferably bolts.

The head 5 has a screw-threaded aperture 10 to receive a screw 11, and the screw has a head 12 of a contour adapted to be engaged by a tool for turning the screw.

Links 13 are mounted on a pivot 14 run through one of the arms 8 and the said links have coinciding apertures 15 to receive a fastening 16, such as a bolt which extends through the other arm, and the arms may thereby be secured at different positions of adjustment to hold the ends of the arms further from or closer to the screw.

Jaws or grapple hooks 17 have shanks 18 oscillatably mounted on pivots 19 carried by the arms, and the outer ends of the arms are recessed as at 20 to form seats for the reception of the shanks 18.

There are two links as shown, one overlying each side of the arms and when the links are properly attached to the arms, it results in a rigid and durable structure.

The screw is preferably reduced or tapered at the end forming a point 21 which will seat on the end of a shaft from which the gear is being removed.

I claim:

A gear puller comprising a head having a threaded aperture, a screw threaded therein, arms, means for pivotally connecting the arms to the head, jaws, means for pivotally connecting the jaws to the arms, links pivotally connected to one of the arms, said links having coinciding apertures and a fastener in the other arm extending through an aperture in each link for adjustably connecting the links to the said arms.

CARL W. STELTING.